United States Patent
Lee (10) Patent No.: US 10,185,419 B2
(45) Date of Patent: Jan. 22, 2019

(54) IMAGE DISPLAY SYSTEM AND RELATED METHOD FOR DETECTING TOUCH INPUT

(71) Applicant: Samsung Display Co., Ltd., Yongin-si, Gyeonggi-do (KR)

(72) Inventor: Ho Eung Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 134 days.

(21) Appl. No.: 15/172,035

(22) Filed: Jun. 2, 2016

(65) Prior Publication Data
US 2017/0102793 A1    Apr. 13, 2017

(30) Foreign Application Priority Data

Oct. 13, 2015 (KR) ......................... 10-2015-0142898

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0416* (2013.01)

(58) Field of Classification Search
CPC ......... G06F 3/041; G06F 3/0412; G06F 3/044
See application file for complete search history.

(56) References Cited

U.S. PATENT DOCUMENTS

| | | | |
|---|---|---|---|
| 8,902,178 B2 | 12/2014 | Han | |
| 2008/0175460 A1* | 7/2008 | Reiner | G06F 17/30244 382/131 |
| 2012/0050216 A1* | 3/2012 | Kremin | G06F 3/0416 345/174 |
| 2013/0215049 A1* | 8/2013 | Lee | G06F 3/0416 345/173 |
| 2014/0253481 A1 | 9/2014 | Kim et al. | |
| 2016/0054849 A1* | 2/2016 | Steiger | G06F 3/0414 345/173 |
| 2016/0162102 A1* | 6/2016 | Shahparnia | G06F 3/0416 345/174 |

FOREIGN PATENT DOCUMENTS

| | | |
|---|---|---|
| KR | 10-2011-0136433 A | 12/2011 |
| KR | 10-1400097 B1 | 5/2014 |
| KR | 10-2014-0109182 A | 9/2014 |

* cited by examiner

*Primary Examiner* — Christopher J Kohlman
(74) *Attorney, Agent, or Firm* — Innovations Counsel LLP (57) ABSTRACT

An image display system may include a host device, a touch-sensing device connected to the host device, and a display device connected to the host device. A method of operating the image display system may include the following steps: determining, using the host device, a required-touch quantity; selecting, using at least one of the host device and the touch-sensing device, a designated area based on the required-touch quantity, wherein the designated area corresponds to a plurality of designated driving electrodes that is a subset of driving electrodes of the touch-sensing device; detecting, using the designated driving electrodes without using other driving electrodes of the touch-sensing device, touch input provided in the designated area; and responding to the touch input using at least one of the host device and the display device.

19 Claims, 8 Drawing Sheets

IMAGE DISPLAY SYSTEM AND RELATED METHOD FOR DETECTING TOUCH INPUT

CROSS-REFERENCE TO RELATED APPLICATION

This application claims priority to and the benefit of Korean Patent Application No. 10-2015-0142898 filed on Oct. 13, 2015 in the Korean Intellectual Property Office; the Korean Patent Application is incorporated herein by reference.

BACKGROUND

1. Field

The technical field relates to an image display system and a method for detecting a touch input by using the image display system.

2. Description of the Related Art

An image display system with touch input functions may include a touch system, a display panel, a display driver, and a host.

When a predetermined image is displayed on the display panel of the image display system, a user may provide a touch input by touching the touch system using a stylus or a finger. The touch system may transmit information concerning the detected touch input to the host. The host may transmit image data corresponding to the touch input to the display driver based on the information. The display driver may drive the display panel in response to the image data. Accordingly, an image corresponding to the touch input may be displayed on the display panel.

SUMMARY

An embodiment may be related to an image display system that is capable of efficiently detecting a touch input. An embodiment may be related to a method for detecting a touch input using the image display device.

An embodiment may be related to a method for detecting a touch input. The method may include the following steps: detecting the number of required touches by using information about a currently executed application; setting a detailed scan area based on the number of required touches; executing a detailed scan while supplying a touch driving signal to each driving electrodes included in the detailed scan area for the duration of a first time; and detecting touch input information by using a result of the detailed scan.

The detecting of the number of required touches may include: receiving the information about the currently executed application, and generating an application list; searching for an application requiring the maximum number of required touches in the application list; and setting the maximum number of required touches as the number of required touches.

The setting of the detailed scan area may include determining whether to execute a preliminary scan based on the number of required touches.

The determining whether to execute the preliminary scan may include comparing the number of required touches with the number of previous touches, and the method may further include executing the preliminary scan before executing the detailed scan when the number of required touches exceeds the number of previous touches.

The executing of the preliminary scan may include executing the preliminary scan while supplying the touch driving signal to all of the driving electrodes of a touch panel for the duration of a second time that is shorter than the first time, respectively. The executing of the preliminary scan may include: checking whether a touch input on an $i^{th}$ (i is a natural number) driving electrode is detected while supplying a touch driving signal to the $i^{th}$ driving electrode among the driving electrodes of a touch panel for the duration of a second time that is shorter than the first time; and checking whether a touch input on $(i-1)^{th}$ and $(i+1)^{th}$ driving electrodes is detected while supplying the touch driving signal to each of the $(i-1)^{th}$ and $(i+1)^{th}$ driving electrodes for the duration of the second time when the touch input on the $i^{th}$ driving electrode is detected, and checking whether a touch input on an $(i+k)^{th}$ (k is a natural number equal to or larger than 2) driving electrode is detected while supplying the touch driving signal to the $(i+k)$ driving electrode for the duration of the second time when the touch input on the $i^{th}$ driving electrode is not detected.

The detailed scan area may include an area, in which the touch input is detected during the executing of the preliminary scan.

The executing of the preliminary scan may be terminated when the number of touch inputs detected during the preliminary scan reaches the number of required touches, or a difference between the number of required touches and the number of previous touches.

The detailed scan area may include an area, in which the touch input is detected by executing the preliminary scan, and a previous touch area.

When the number of required touches is equal to or smaller than the number of previous touches, the preliminary scan may be determined to be omitted.

The detailed scan area may be set with a previous touch area.

At least one of the setting of the detailed scan area and the executing of the detailed scan may further include selectively connecting some of the driving electrodes and the sensing electrodes formed on a touch panel to a touch driver.

An embodiment may be related to a system for displaying an image. The system may include the following elements: a touch panel including a plurality of driving electrodes and a plurality of sensing electrodes; a touch driver configured to receive a sensing signal from the sensing electrodes while applying a touch driving signal to at least some of the driving electrodes; and a host configured to detect the number of required touches by using information about a currently executed application, and control the touch driver based on the number of required touches.

The host may extract an application requiring the maximum number of required touches from among the currently executed applications, and set the maximum number of required touches as the number of required touches.

The touch driver may set a part of an active area of the touch panel as a detailed scan area based on the number of required touches.

The touch driver may determine whether to execute a preliminary scan by comparing the number of required touches with the number of previous touches.

The touch driver may execute the preliminary scan when the number of required touches exceeds the number of previous touches, and combine an area, in which the touch input is detected during the executing of the preliminary scan, with a previous touch area and sets the detailed scan area.

The touch driver may determine a driving electrode, to which the touch driving signal is to next applied, in real time based on the driving electrode, in which the touch input is detected, when the touch input is detected during the executing of the preliminary scan.

When the number of required touches is equal to or smaller than the number of previous touches, the touch driver may determine to omit the preliminary scan, and set a previous touch area as the detailed scan area.

The system may further include a channel selector, which is connected between the touch panel and the touch driver, and selectively connects some of the driving electrodes and the sensing electrodes to the touch driver.

An embodiment may be related to a method of operating an image display system. The image display system may include a host device, a touch-sensing device electrically connected to the host device, and a display device electrically connected to the host device. The touch-sensing device may include driving electrodes and sensing electrodes that intersect the driving electrodes in a plan view of the touch-sensing device. The method may include the following steps: determining, using the host device, a required-touch quantity; setting, using at least one of the host device and the touch-sensing device, a designated area based on the required-touch quantity, wherein the designated area corresponds to a plurality of designated driving electrodes that is a subset of the driving electrodes of the touch-sensing device; performing, using the designated driving electrodes without using other driving electrodes of the touch-sensing device, designated-area touch detection to detect touch input provided in the designated area; and responding to the touch input using at least one of the host device and the display device.

The method may include the following steps: simultaneously running a plurality of application programs using the host device; among the application programs, identifying an application program that requires most touches as input, wherein the application program requires a number of touches; and setting the required-touch quantity equal to the number of touches required by the application program.

The method may include the following steps: determining a previous-touch quantity, which may be equal to a number of touches detected in a previous touch detection period; comparing the required-touch quantity with the previous-touch quantity; if the required-touch quantity is less than or equal to the previous-touch quantity, setting a previous-touch area as the designated area, wherein the previous-touch area corresponds to the touches detected in the previous touch detection period; and if the required-touch quantity is greater than the previous-touch quantity, performing preliminary touch detection for determining the designated area.

The preliminary touch detection may be performed for a preliminary-detection time duration. The designated-area touch detection may be performed for a designated-area-detection time duration. The designated-area-detection time duration may be longer than the preliminary-detection time duration.

The method may include the following steps: detecting one or more touches through the preliminary touch detection; setting a touch-detected area based on information related to the one or more touches; and setting a combination of the touch-detected area and the previous-touch area as the designated area.

The method may include terminatating the preliminary touch detection in response to a condition that a number of touches detected during the preliminary touch detection reaches the required-touch quantity.

The method may include terminatating the preliminary touch detection in response to a condition that a number of touches detected during the preliminary touch detection reaches a difference between the required-touch quantity and the previous-touch quantity.

The preliminary touch detection uses (and/or involves) more driving electrodes of the touch-sensing device than the designated driving electrodes (which are used in the designated-area touch detection).

The preliminary touch detection may include the following steps: selecting a present driving electrode from the driving electrodes of the touch-sensing device; detecting whether any touch may be provided on the present driving electrode; if at least one touch is detected on the present driving electrode, performing touch-sensing using an immediately neighboring driving electrode, and setting a first next present driving electrode, wherein no intervening driving electrode exists between the immediately neighboring driving electrode and the present driving electrode, and wherein at least two intervening driving electrodes exist between the first next present driving electrode and the present driving electrode; and if no touch is detected on the present driving electrode, setting a second next present driving electrode, wherein at least one intervening driving electrode exists between the second next present driving electrode and the present driving electrode.

No touch-sensing with the immediately neighboring driving electrode may be performed between the detecting with the present driving electrode and the setting of the second next present driving electrode.

The method may include the following steps: determining whether the preliminary touch detection may be terminated; if the preliminary touch detection is not terminated, selecting the first next present driving electrode or the second next present driving electrode as the present driving electrode.

The method may include selectively electrically connecting, using a chancel selector, the designated driving electrodes to a driver of the touch-sensing device while electrically disconnecting the other driving electrodes from the driver of the touch-sensing device.

An embodiment may be related to a system for display an image. The system may include a host device, a touch-sensing device, and a display device. The host device may determine a required-touch quantity. The touch-sensing device may be electrically connected to the host device, may include driving electrodes, and may include sensing electrodes that intersect the driving electrodes in a plan view of the touch-sensing device. At least one of the host device and the touch-sensing device may set a designated area based on the required-touch quantity. The touch-sensing device may perform designated-area touch detection using the designated driving electrodes, without using other driving electrodes of the touch-sensing device, to detect touch input provided in the designated area. The designated area corresponds to a plurality of designated driving electrodes that is a subset of the driving electrodes of the touch-sensing device. The display device may be electrically connected to the host device. At least one of the display device and the host device may respond to the touch input, for example, by displaying a new image.

The host device may simultaneously run a plurality of application programs, may identifying among the application programs an application program that requires more touches as input than others of the application programs, and may set the required-touch quantity equal to a number of touches required by the application program.

One or more of the host device and the touch-sensing device may determine a previous-touch quantity, may compare the required-touch quantity with the previous-touch quantity, and may set a previous-touch area as the designated area if the required-touch quantity may be less than or equal to the previous-touch quantity. The previous-touch quantity may be equal to a number of touches detected in a previous touch detection period. The previous-touch area may correspond to the touches detected in the previous touch detection period. The touch-sensing device may perform preliminary touch detection for determining the designated area if the required-touch quantity is greater than the previous-touch quantity.

The touch-sensing device may perform the preliminary touch detection for a preliminary-detection time duration. The touch-sensing device may perform the designated-area touch detection for a designated-area-detection time duration. The designated-area-detection time duration may be longer than the preliminary-detection time duration.

The touch-sensing device may detect one or more touches through the preliminary touch detection and to set a touch-detected area based on information related to the one or more touches. One or more of the host device and the touch-sensing device may set a combination of the touch-detected area and the previous-touch area as the designated area.

The touch-sensing device may use more driving electrodes in performing the preliminary touch detection than in performing the designated-area touch detection.

The touch-sensing device may select a present driving electrode from the driving electrodes, may detect whether any touch may be provided on the present driving electrode, may perform touch-sensing using an immediately neighboring driving electrode and set a first next present driving electrode if at least one touch is detected on the present driving electrode, and may set a second next present driving electrode if no touch is detected on the present driving electrode. No intervening driving electrode may exist between the immediately neighboring driving electrode and the present driving electrode. At least two intervening driving electrodes may exist between the first next present driving electrode and the present driving electrode. At least one intervening driving electrode may exist between the second next present driving electrode and the present driving electrode.

The touch-sensing device may include a channel selector and a driver. The channel selector may selectively electrically connect the designated driving electrodes to the driver while electrically disconnecting the other driving electrodes of the touch-sensing device from the driver.

DETAILED DESCRIPTION

Embodiments are described in detail with reference to the accompanying drawings. The described embodiments are illustrative. Possible embodiments are not limited to the described embodiments.

Although the terms "first", "second", etc. may be used herein to describe various elements, these elements should not be limited by these terms. These terms may be used to distinguish one element from another element. Thus, a first element discussed in this application may be termed a second element without departing from embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The term "connect" may mean "mechanically connect", "electrically connect", "directly connect", or "indirectly connect". The term "insulate" may mean "electrically insulate". The term "conductive" may mean "electrically conductive". The term "electrically connected" may mean "electrically connected without any intervening transistors".

Figure 1:
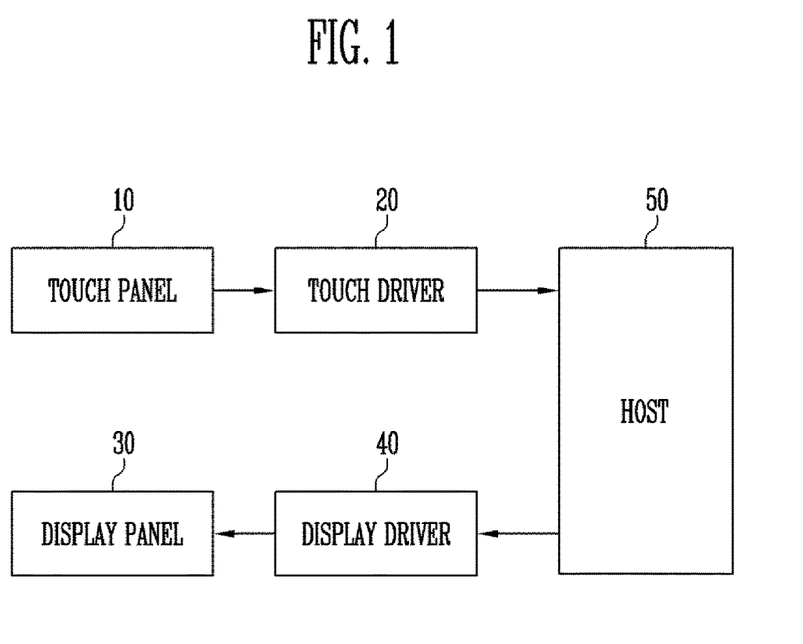
FIG. 1 is a diagram illustrating an image display system according to an embodiment.

FIG. 1 is a diagram illustrating an image display system according to an embodiment. The image display system has a touch input function.

Referring to FIG. 1, the image display system includes a touch panel 10, a touch driver 20, a display panel 30, a display driver 40, and a host 50 (e.g., an application processor). The touch panel 10 and the display panel 30 may be individually configured and then combined, or may be an integrated single panel.

When a predetermined image is displayed on the display panel 30, a user may provide a touch input on the touch panel 10 using a finger or a stylus.

When the touch input is provided, a sensing signal is changed.

The touch driver 20 receives the changed sensing signal and extracts information about the touch input based on the changed sensing signal. The extracted information about the touch input is transmitted to the host 50.

The host 50 supplies image data and/or a control signal to the display driver 40 based on the information about the touch input.

The display driver 40 drives the display panel 30 in response to the image data and/or the control signal. Thus, an image corresponding to the touch input provided by the user is displayed on the display panel 30.

Figure 2:
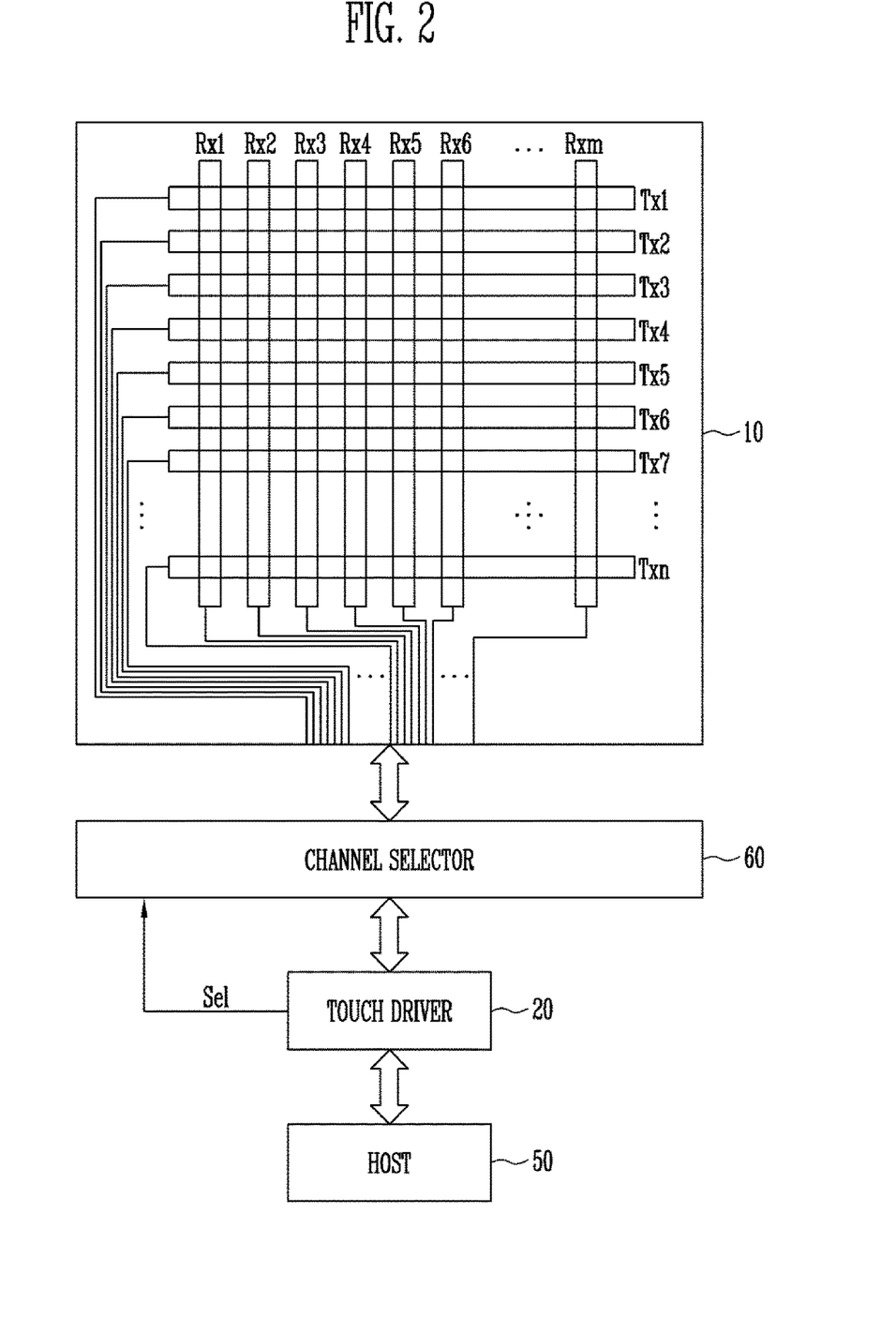
FIG. 2 is a diagram illustrating a touch detecting system according to an embodiment.

FIG. 2 is a diagram illustrating a touch detecting system according to an embodiment. The touch detecting system may be included in the image display system illustrated in FIG. 1.

Referring to FIG. 2, the touch detecting system includes a touch panel 10, a touch driver 20, a host 50, and a channel selector 60.

The touch panel 10 includes driving electrodes Tx1, Tx2, Tx3, Tx4, Tx5, Tx6, Tx7, Txn (which are insulated from each other) and includes sensing electrodes Rx1, Rx2, Rx3, Rx4, Rx5, Rx6, Rxm (which are insulated from each other). The touch panel 10 outputs sensing signals through the sensing electrodes based on touch driving signals applied to the driving electrodes. When a touch input is provided to a region of the touch panel 10, one or more changed sensing signals may be output through one or more sensing electrodes positioned in the region.

The touch driver 20 may receive the sensing signals and the changed sensing signals from the sensing electrodes while applying the touch driving signals to the driving electrodes. The touch driver 20 may include a transmission circuit for applying the touch driving signals to the driving electrodes, a reception circuit for receiving the sensing signals and the changed signals from the sensing electrodes, and a signal processor for extracting touch input information about whether a touch input is generated and/or coordinates of the touch input from the received sensing signals and/or the changed sensing signals. The touch driver 20 may be implemented in a touch integrated circuit (IC), in which the transmission circuit, the reception circuit, and the signal processor are integrated.

The touch driver 20 receives information on the number of required touches from the host 50, and determines a scan method and/or a detailed scan area (i.e., a designated area for touch detection) for the touch panel 10 based on the received information.

The host 50 controls the display driver 40 (illustrated in FIG. 1) in response to the touch input information received from the touch driver 20, and controls an operation of the touch driver 20.

The host 50 detects the number (or amount/quantity) of required touches using information related to at least an application currently executed in the image display system, and controls the touch driver 20 based on the detected number of required touches.

For example, the host 50 identifies an application requiring the maximum number of required touches among currently executed applications, and sets or updates the maximum number of required touches required by the identified application as the number of required touches which needs to be detected by the touch panel 10.

For example, the host 50 may operate an algorithm for determining the number of required touches whenever a new image is displayed, and reset the number of required touches appropriate for the new image (which has become a current image).

The host 50 provides information on the set number of required touches to the touch driver 20, and the touch driver 20 sets a scan method and a scan area based on the received number of required touches.

The channel selector 60 is connected between the touch panel 10 and the touch driver 20 to selectively connect some of the driving electrodes and the sensing electrodes to the touch driver 20.

The channel selector 60 receives a selection signal Sel for channel addressing from the touch driver 20, and controls a connection between the driving electrodes and the touch driver 20 and/or a connection between the sensing electrodes and the touch driver 20 in response to the received selection signal Sel.

The channel selector 60 may be, for example, a multiplexer (MUX).

The channel selector 60 may include a plurality of input/output wires (or input/output pins) connected to all of the driving electrodes and the sensing electrodes of the touch panel 10.

The touch driver 20 (which may be implemented with a single touch IC) may include a limited number of input/output wires (or input/output pins). The amount of input/output wires (or input/output pins) of the touch driver may be less than the amount of the driving electrodes and/or the amount of the sensing electrodes.

The touch driver 20 requests that the input/output wires of the touch driver 20 are connected to specific electrodes among the driving electrodes and the sensing electrodes by transmitting the selection signal Sel to the channel selector 60.

The channel selector 60 connects the input/output wires of the touch driver 20 to the designated driving electrodes and/or sensing electrodes in response to the selection signal Sel.

The channel selector 60 handles a decoding function for the connection of the wires, and the touch driver 20 selects the driving electrodes and/or the sensing electrodes to be connected.

Since the channel selector 60 is provided, it is possible to configure the touch driver 20 with a single touch IC without needing multiple touch ICs even though the touch panel 10 has a large area. Since the number of ICs is minimized, it is possible to advantageously reduce cost, and synchronization and/or communication-protocol processing between ICs may be unnecessary.

Figure 3:
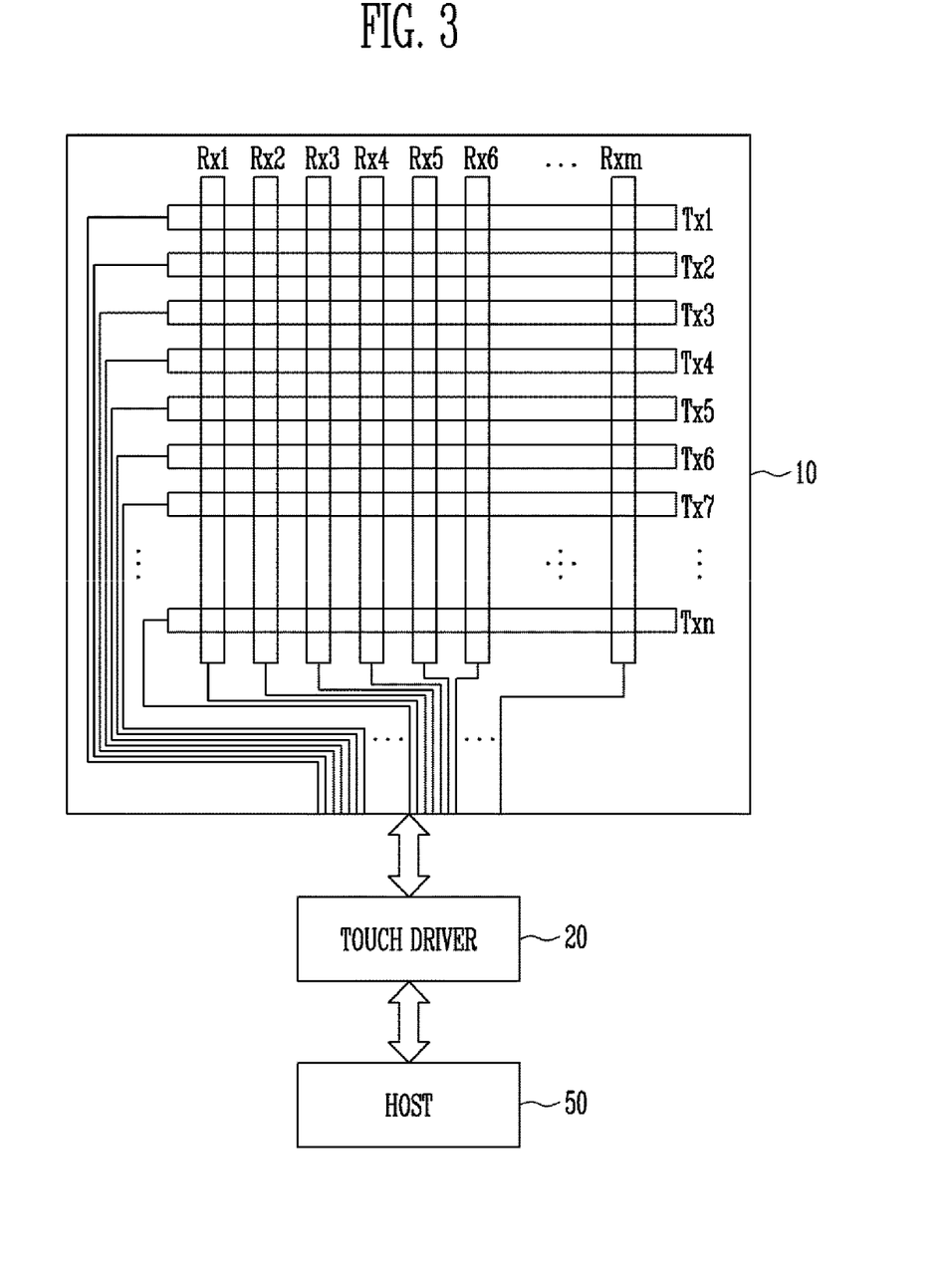
FIG. 3 is a diagram illustrating a touch detecting system according to an embodiment.

FIG. 3 is a diagram illustrating a touch detecting system according to an embodiment. Referring to FIG. 3, the touch detecting system and/or the image display system may not require the channel selector 60 illustrated in FIG. 2. For example, when the number of channels of the single touch IC of the touch driver 20 is sufficient to be connected to all of the driving electrodes and the sensing electrodes of the touch panel 10, the channel selector 60 may be unnecessary.

The touch driver 20 may include input/output wires connected to the driving electrodes and the sensing electrodes.

The touch driver 20 determines which ones of the driving electrodes are to be scanned and/or a scan method based on the information on the number of required touches received from the host 50.

For example, the touch driver 20 sets only a partial area of the touch panel 10 as a detailed scan area for touch detection based on the information on the number of required touches, and whether to execute a preliminary scan may be determined in the step of setting the detailed scan area.

Figure 4:
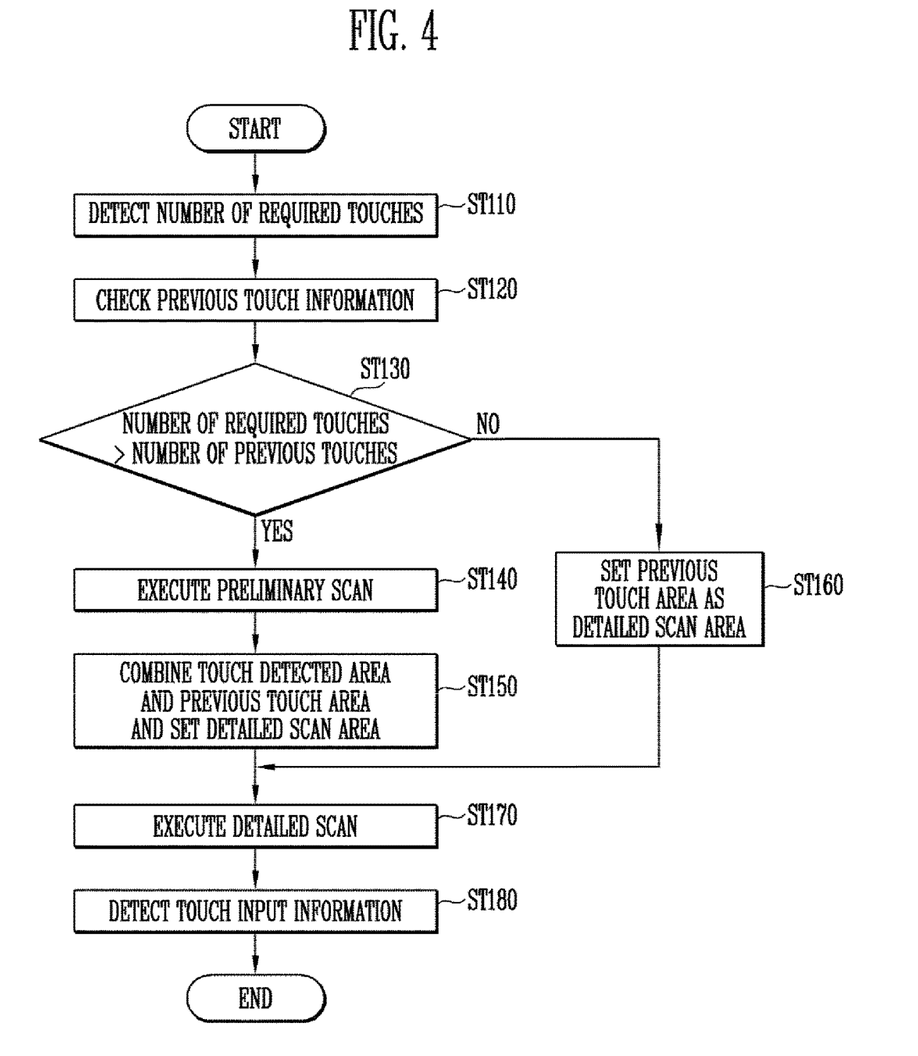
FIG. 4 is a flowchart illustrating a method for detecting a touch input according to an embodiment.

FIG. 4 is a flowchart illustrating a method for detecting a touch input according to an embodiment. The method for detecting a touch input may be performed using elements illustrated in FIGS. 1 and 2.

<Required Touch Number Detecting Step: ST110>

In a situation requiring a touch input, such as when a displayed image is changed or when a new application is executed, the host 50 determines the number (or amount) of required touches required in a current situation. For example, the host 50 may determine the number of required touches using information about the currently executed application. Information on the number of required touches detected by the host 50 is transmitted to the touch driver 20.

<Detailed Scan Area (i.e., Designated Area) Setting Steps ST120, ST130, ST140, ST150, and ST160>

The touch driver 20 receives the number of required touches from the host 50 and selects only a partial area in an active area of the touch panel 10 based on the number of required touches, and sets the selected area as a detailed scan area. In an embodiment, efficiency of the touch detection is improved by designating an area that actually requires a detailed scan and by scanning the designated area in detail, instead of scanning the whole touch panel 10.

The detailed scan means a scan performed by applying a touch driving signal (or a copy of a touch driving signal) to each of the driving electrodes included in the detailed scan area for a sufficient time, for example, for a first predetermined time duration enough to detect a touch input with at least predetermined accuracy. When the detailed scan is performed, sufficient accuracy of touch detection may be attained for at least the detailed scan area.

If the detailed scan is performed on all of the driving electrodes of the touch panel 10, especially for a large-size touch panel 10, time for detecting the touch input may be significantly long, such that the response speed of the image display system may be unsatisfactory.

According to embodiments, instead of performing the detailed scan on all of the driving electrodes, an area actually requiring detailed scan is designated, and detailed scan is performed in only the designated area, to improve efficiency.

In the step ST120, the touch driver 20 may check previous touch information recognized during a previous touch detection period. In the step ST130, the touch driver 20 determine whether to perform a preliminary scan according to a result of a comparison between the checked previous touch information and the number of required touches received from the host 50. The previous touch information may contain the number (or quantity) of previous touches, coordinates of a previous touch area, and the like.

For example, when the number (or quantity) of required touches exceeds the number (or quantity) of previous touches, the touch driver 20 may determine the execution of the preliminary scan, and execute the preliminary scan on at least some of the driving electrodes.

The preliminary scan includes receiving sensing signals from the sensing electrodes while applying touch driving signals to at least some of the driving electrodes for a second predetermined time duration, which is short but enough to determine whether a touch input is provided on the driving electrodes that have received touch driving signals.

The second time duration may be set shorter than the first time duration, during which a touch driving signal is applied to each driving electrode in the detailed scan area. The preliminary scan is performed for confirming whether a touch input is provided and may be executed before the execution of the detailed scan.

In the step ST140 of executing the preliminary scan, whether a touch input is provided is determined by checking whether there is a sensing signal having a value exceeding a predetermined threshold value in the area where touch driving signals are applied to driving electrodes.

According to an embodiment, in the preliminary scan step, the preliminary scan may be executed for all of the driving electrodes for the second time duration while supplying touch driving signal to all the driving electrodes.

According to an embodiment, in the preliminary scan step, the preliminary scan may also be executed on some of the driving electrodes.

According to an embodiment, the preliminary scan may also be terminated before the second time duration ends. For example, when the number of touch inputs detected during the preliminary scan reaches the number of required touches or reaches a difference between the number of required touches and the number of previous touches, the preliminary scan step may automatically terminates.

In the step ST150, a combination of a touch detected area and a previous touch area may be set as the detailed scan area. The touch detected area may be an area in which one or more touches are detected during the preliminary scan. The previous touch area may be set to an area within a predetermined distance from a point at which a touch input has been provided during a previous touch input detection period.

If the touch driver 20 determines that the number of required touches is equal to or smaller than the number of previous touches in the step ST130, the touch driver 20 may determine to omit the preliminary scan and set the previous touch area as the detailed scan area in the step ST160.

<Detailed Scan Executing Step: ST170>

When the detailed scan area is set, the touch driver 20 may execute the detailed scan by sequentially supplying touch driving signals to the driving electrodes associated with the detailed scan area for first time duration, which is enough to precisely detect one or more touch inputs.

In the detailed scan step ST170, the touch driver 20 receives sensing signals from the sensing electrodes.

<Touch Input Information Detecting Step: ST180>

The touch driver 20 detects touch input information using a result of the detailed scan. The touch input information may contain whether a touch input exists, the number of touch inputs, and/or coordinates of the touch input(s).

The result of the detailed scan is obtained by thoroughly scanning the detailed scan area, so that satisfactory accuracy of touch detection may be attained.

According to embodiments, a present-touch area in which a touch input is detected during the preliminary scan process and/or a previous-touch area in which a touch input is detected in a previous scan (e.g., an immediately preceding scan) may be set as the detailed scan area, and the detailed scan is executed only for the detailed scan area instead of the whole touch panel 10. According to embodiments, the detailed scan area may be updated in real time according to the present-touch area and/or the previous-touch area, and the detailed scan is performed only on the updated detailed scan area. Accordingly, the image display system may detect a touch input at a high speed with high accuracy, thereby efficiently and effectively responding to the touch input.

According to embodiments, the image display system may minimize power consumption by avoid scanning the whole touch panel 10.

In an embodiment, the image display system may include the channel selector 60 illustrated in FIG. 2, and the method for detecting a touch input may further include a step of selectively connecting some of the driving electrodes and the sensing electrodes to the touch driver 20 in at least one of the step of setting the detailed scan area (e.g., the step ST140, the step ST150, and/or the step ST160) and the step of executing the detailed scan (e.g., the step ST170).

For example, a step of selectively connecting some of the driving electrodes and the sensing electrodes to the touch driver 20 may be performed in each of the step of executing the preliminary scan and the step of executing the detailed scan.

In an embodiment, a step of determining whether to execute the preliminary scan may be omitted during an initial touch detection period after a display is turned on, the preliminary scan may be executed for all of the driving electrodes during the initial touch detection period, and the detailed scan area may be set using a result of the preliminary scan.

Figure 5:
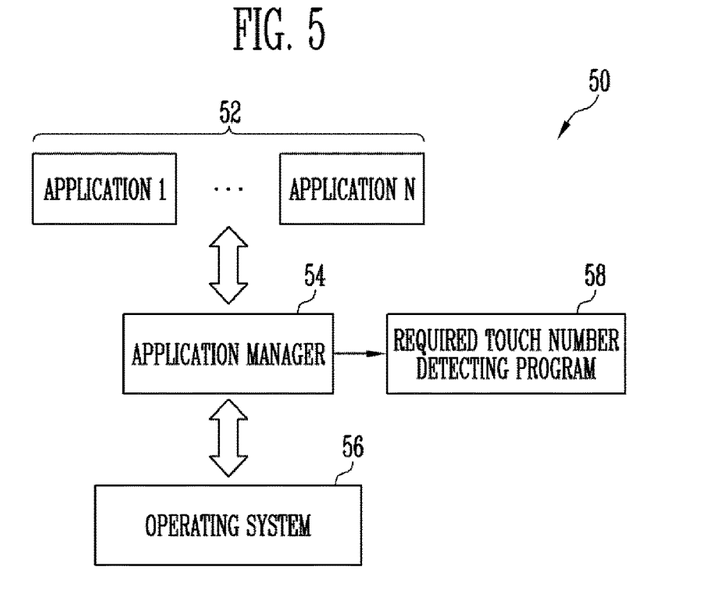
FIG. 5 is a diagram illustrating a host according to an embodiment.

FIG. 5 is a diagram illustrating the host 50 according to an embodiment.

Referring to FIG. 5, the host 50 includes various application execution programs 52 (including Application 1 and Application N), an application manager 54 (which has attribute information about each of the application execution programs 52 and controls the application execution programs 52), and an operating system 56 (which manages the entire image display system).

The host 50 further includes a required touch number detection program 58 for detecting the number of required touches for controlling the touch driver 20.

The required touch number detection program 58 may, for example, detect the number of required touches using a required touch number extraction algorithm whenever a displayed image change is performed the display panel 30.

The required touch number detection program 58 may exist in a middleware layer together with the application manager 54 and/or may be implemented (and configured) within the application manager 54.

The image display system including the host 50 illustrated in FIG. 5 may simultaneously perform various applications and display one or more images associated with the applications on the display panel.

The required touch number detection program 58 may detect the number of required touches by analyzing information about a currently executed application.

Figure 6:
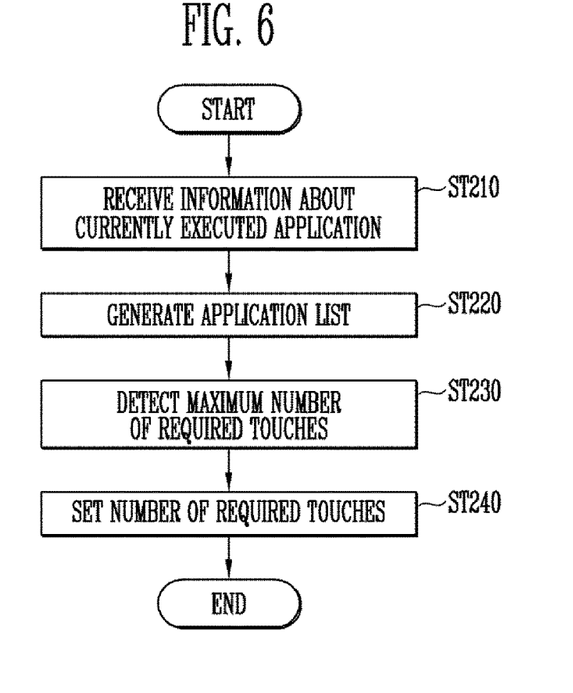
FIG. 6 is a flowchart illustrating a method for detecting the number of required touches according to an embodiment.

FIG. 6 is a flowchart illustrating a method for detecting the number of required touches according to an embodiment.

<Application Information Receiving Step: ST210>

In response to a predetermined condition, such as when the display image is changed and/or when a new touch input is required, the required touch number detection program 58 receives information about one or more applications that are currently executed (and have associated images being displayed on the display panel 30) from the application manager 54.

For example, the required touch number detection program 58 may receive information about one or more widgets that have related images currently output on the display panel 30.

<Application List Generating Step: ST220>

The required touch number detection program 58 (which has received the information about the currently executed application or applications) generates an application list related to the currently executed application(s).

<Maximum Required Touch Number Detecting Step: ST230>

The required touch number detection program 58 identifies an application that requires the largest number of multi-touch inputs using information about all of the applications included in the application list, for example, information about various widgets, and detects (i.e., determines) the maximum number of required touches required by the identified application.

<Required Touch Number Setting Step: ST240>

The required touch number detection program 58 sets or updates the detected maximum number of required touches as the set number of required touches, and transmits information on the set number of required touches to the touch driver 20.

Figure 7A:
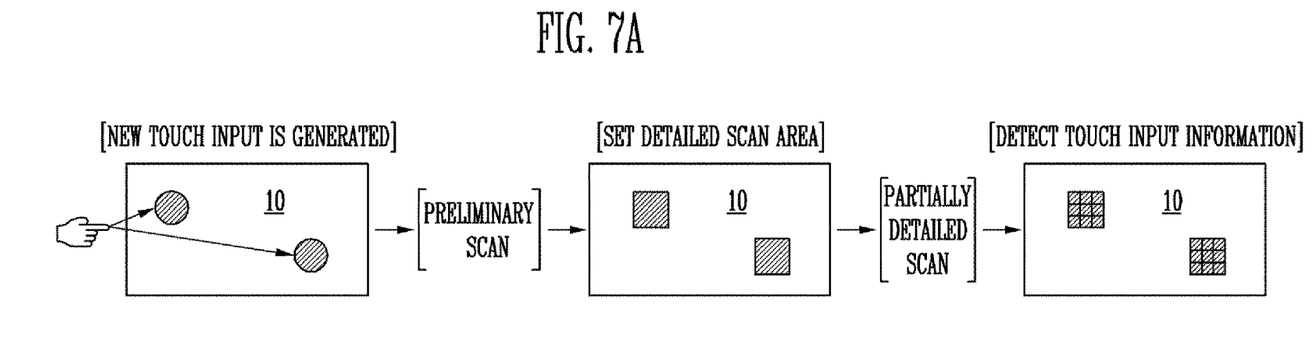
FIG. 7A is a diagram illustrating an embodiment of a method for detecting a touch input when a new touch input is provided.

FIG. 7A is a diagram illustrating an embodiment of a method for detecting a touch input when a new touch input is provided. In an embodiment, the number of required touches is 2, a new touch input with the number of required touches is provided, and a preliminary scan is executed.

Referring to FIG. 7A, when a user provides two new multi-touch inputs to the touch panel 10, a detailed scan area is set through a preliminary scan.

In the preliminary scan step, whether a touch input exists and coordinates of the touch input are recognized by checking whether there is a sensing signal having a value exceeding a threshold value among the sensing signals received from the sensing electrodes Rx while applying a touch driving signal to at least some of the driving electrodes for a short time duration.

When two touches are detected in the preliminary scan step, two detailed scan areas are set. The two detailed scan areas include intersections of driving electrodes and sensing electrodes positioned within a predetermined distance from two points at which the touch input is detected.

Subsequently, a detailed scan is executed on only the set detailed scan area, while other area of the touch panel 10 is not scanned. Accordingly, the image display system may effectively and efficiently detect touch input with high accuracy for the detailed scan area.

Figure 7B:
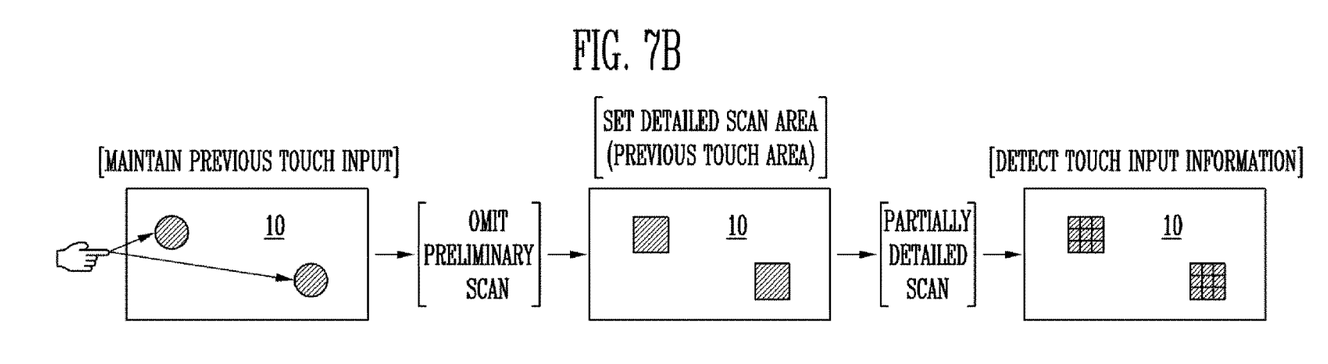
FIG. 7B is a diagram illustrating an embodiment of a method for detecting a touch input when a previous touch input is maintained.

FIG. 7B is a diagram illustrating an embodiment of a method for detecting a touch input when a previous touch input is maintained. In an embodiment, the number of required touches is 2, a previous touch input is maintained, and no new touch input is provided.

Referring to FIG. 7B, when a previous touch input is maintained with no new touch input being provided, the number of required touches is set to be the number of previous touches or less. Accordingly, preliminary scan may be unnecessary and may be omitted, and a previous touch area is set to a detailed scan area.

A detailed scan is executed on only the set detailed scan area, while other area of the touch panel 10 is not scanned. Accordingly, the image display system may effectively and efficiently detect touch input with high accuracy for the detailed scan area.

Since no preliminary scan is performed, the image display system may respond to the touch input with high speed by reducing time allocated for detecting the touch and/or may improve accuracy of touch detection by assigning more time to the detailed scan.

Figure 8:
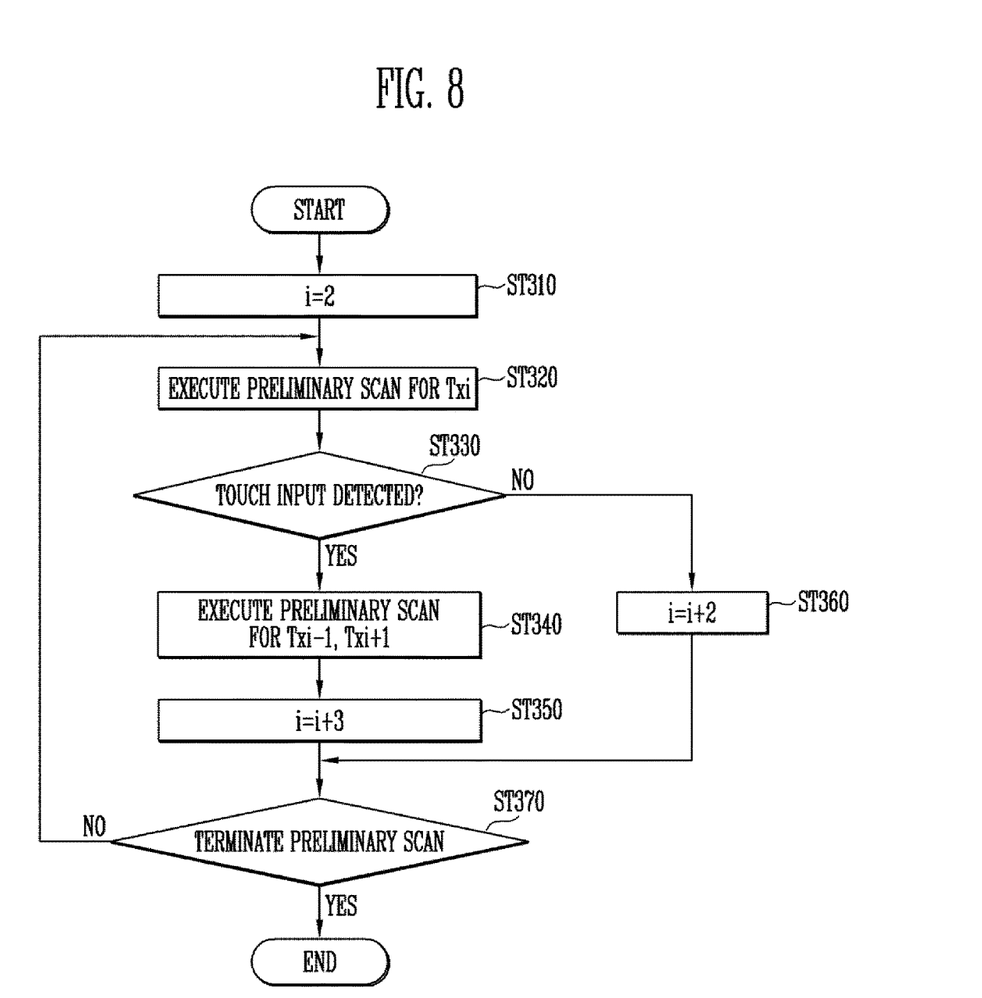
FIG. 8 is a flowchart illustrating a preliminary scan method according to an embodiment.

FIG. 8 is a flowchart illustrating a preliminary scan method according to an embodiment. In an embodiment, the preliminary scan is executed only for some of the driving electrodes. In an embodiment, the preliminary scan may be sequentially executed for all of the driving electrodes. In an embodiment, when a touch input is detected during a preliminary scan process, a scan order is determined in real time based on a detected touch input area.

<First Driving Electrode Selecting Step: ST310>

When a preliminary scan step starts, an $i^{th}$ (i is a natural number) driving electrode Txi, to which a touch driving signal is to be first applied, is first selected among the driving electrodes. For example, if the preliminary scan starts from a driving electrode in the second row, that is, a second driving electrode Tx2, i=2.

<Selected Driving Electrode Preliminary Scan Step: ST320>

Sensing signal are received from the sensing electrodes while supplying a touch driving signal to the $i^{th}$ driving electrode Txi for a second time duration, which has been set as a minimum scan time required for determining whether a touch input exists.

In an embodiment, preliminary scan for a previous touch area may be omitted.

<Touch Input Detecting Step: ST330>

Whether a touch input is provided on the $i^{th}$ driving electrode Txi is detected/determined using the sensing signals received from the sensing electrodes. Whether the touch input is provided may be detected (or determined) by checking whether any of the sensing signals has a value exceeding a threshold value.

<Next Driving Electrode Selecting Step: ST340, ST350, and ST360>

If a touch input on the $i^{th}$ driving electrodes Txi is detected in the step ST330, in the step ST340, a preliminary scan is performed for checking whether any touch input is provided on at least one of the $(i-1)^{th}$ and $(i+1)^{th}$ driving electrodes Tx(i−1) and Tx(i+1) by supplying touch driving signals for the second time duration to each of the $(i-1)^{th}$ and $(i+1)^{th}$ driving electrodes Tx(i−1) and Tx(i+1), which immediately neighbor the $i^{th}$ driving electrode Txi. After the preliminary scan for the $(i-1)^{th}$ and $(i+1)^{th}$ driving electrodes Tx(i−1) and Tx(i+1) has been completed, in the step ST350, a next driving electrode is selected by updating a value of i so that one or more driving electrodes, including the $(i+1)^{th}$ driving electrode Tx(i+1), are skipped. For example, the driving electrodes Tx(i+1) and Tx(i+2) may be skipped, and i=i+3.

That is, if a touch input is detected in the step ST330 of executing the preliminary scan, the touch driver 20 determines a next driving electrode to which a touch driving signal is to be applied in real time based on the driving electrode, for example, the $i^{th}$ driving electrodes Txi, in which the touch input is detected.

If no touch input on the $i^{th}$ driving electrodes Txi is detected in the step ST330, in the step ST360, a value of i is updated to i+k (k is a natural number equal to or larger than 2) so that one or more driving electrodes, including the $(i+1)^{th}$ driving electrode Tx(i+1), may be skipped. For example, the driving electrode Tx(i+1) may be skipped, and i=i+2.

The steps ST340 and ST350 and/or the step ST360 of selecting the next driving electrode may be repeated until the preliminary scan is terminated.

<Preliminary Scan Termination Determining Step: ST370>

If a preliminary scan termination command is received by the touch driver 20 and/or if the number of detected touches detected during the preliminary scan process reaches the target number of detected touches (for example, the number of required touches or a difference between the number of required touches and the number of previous touches), the preliminary scan is terminated.

If the preliminary scan is not terminated, a preliminary scan is performed for the next driving electrode selected in the step ST350 or the step ST360.

Figure 9:
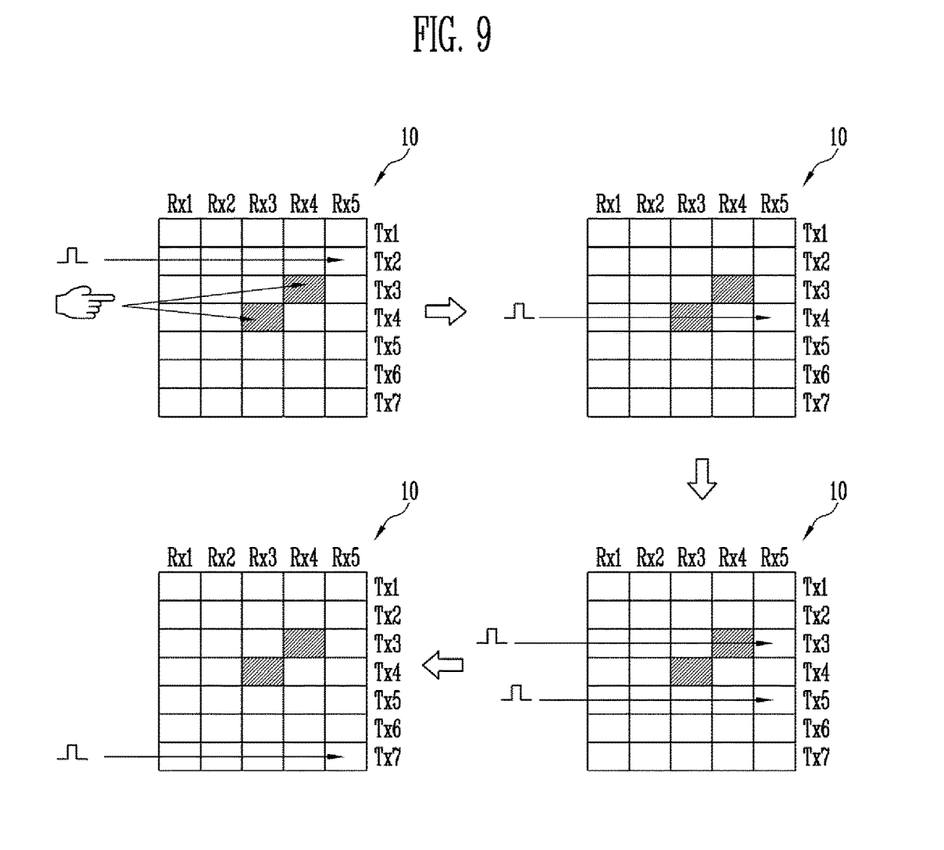
FIG. 9 is a diagram schematically illustrating the preliminary scan method discussed with reference to FIG. 8 according to an embodiment.

FIG. 9 is a diagram schematically illustrating the preliminary scan method discussed with reference to FIG. 8 according to an embodiment. FIG. 9 illustrates a structure of the touch panel 10 so as to clearly show the preliminary scan method described in FIG. 8. In an embodiment, as illustrated in FIG. 9, a touch input is provided at two points, for example, a first point at an intersection of a third driving electrode and a fourth sensing electrode and a second point at an intersection of a fourth driving electrode and a third sensing electrode.

Referring to FIG. 9, for example, when an initial value of i is set to "2", a touch driving signal is applied to the second driving electrode Tx2.

Since no touch input is detected on the second driving electrode Tx2, the value of i is updated to, for example, "4" so that at least one driving electrode immediately neighboring the second driving electrode Tx2 may be skipped.

After the value of i has been updated to "4", a touch driving signal is applied to the fourth driving electrode Tx4.

Since a touch input is provided on the fourth driving electrode Tx4, the touch input is detected. That is, in the step ST320 of executing the preliminary scan for the fourth driving electrode Tx4, the touch input provided at the intersection of the fourth driving electrode Tx4 and the third sensing electrode Rx3 is detected.

Since a touch input has been detected on the fourth driving electrode Tx4 in the step ST330, in the step ST340, in the step ST340, preliminary scans may be performed by applying touch driving signals to the third and fifth driving electrodes Tx3 and Tx5, which immediately neighbor the fourth driving electrode Tx4. In an embodiment, touch driving signals may be sequentially applied to the third and fifth driving electrodes Tx3 and Tx5. In the step ST340 of performing the preliminary scans on the third and fifth driving electrodes Tx3 and Tx5, the touch input provided at the intersection of the third driving electrode Tx3 and the fourth sensing electrode Rx4 is detected.

After the preliminary scans for the third and fifth driving electrodes Tx3 and Tx5 have been performed, the value of i is updated so that at least one driving electrode, e.g., driving electrodes including and immediately neighboring the fifth driving electrode Tx5, may be skipped. For example, the value of i may be updated to "7".

In the step ST320, the preliminary scan for a seventh driving electrode Tx7 is performed. According to the step ST370, since the seventh driving electrode Tx7 is the last driving electrode, the preliminary scan step is terminated.

In an embodiment, if the number of detected touches detected during the preliminary scan process reaches the target number of detected touches, the preliminary scan step may be terminated.

According to an embodiment, a driving electrode on which a preliminary scan is to be next performed is determined in real time according to the result of the present preliminary scan.

According to an embodiment, no preliminary scan may be performed for a section where no touch input is provided, and a preliminary scan may be performed where a touch input is provided. Accordingly, it is possible to improve accuracy of detection of touch input while reducing preliminary scan time.

According to embodiments, detailed scan is performed on an area where a touch input is provided rather than on the whole touch panel. Advantageously, it is possible to efficiently detect the touch input.

Embodiments have been specifically described. Those skilled in the art will appreciate that various modifications may be made without departing from the scope and spirit of the embodiments.

What is claimed is:

1. A method of operating an image display system, the image display system comprising a host device, a touch-sensing device electrically connected to the host device, and a display device electrically connected to the host device, the touch-sensing device comprising driving electrodes and sensing electrodes intersecting the driving electrodes in a plan view of the touch-sensing device, the method comprising:
   determining, using the host device, a required-touch quantity by:

simultaneously running a plurality of application programs using the host device;
among the application programs, identifying an application program that requires most touches as input, wherein the application program requires a number of touches greater than or equal to two; and
setting the required-touch quantity equal to the number of touches required by the application program;
setting, using at least one of the host device and the touch-sensing device, a designated area based on the required-touch quantity, wherein the designated area corresponds to a plurality of designated driving electrodes that is a subset of the driving electrodes of the touch-sensing device;
performing, using the designated driving electrodes without using other driving electrodes of the touch-sensing device, designated-area touch detection to detect touch input provided in the designated area; and
responding to the touch input using at least one of the host device and the display device.

2. The method of claim 1 comprising:
selectively electrically connecting, using a channel selector, the designated driving electrodes to a driver of the touch-sensing device while electrically disconnecting the other driving electrodes from the driver of the touch-sensing device.

3. A method of operating an image display system, the image display system comprising a host device, a touch-sensing device electrically connected to the host device, and a display device electrically connected to the host device, the touch-sensing device comprising driving electrodes and sensing electrodes intersecting the driving electrodes in a plan view of the touch-sensing device, the method comprising:
determining, using the host device, a required-touch quantity;
setting, using at least one of the host device and the touch-sensing device, a designated area based on the required-touch quantity, wherein the designated area corresponds to a plurality of designated driving electrodes that is a subset of the driving electrodes of the touch-sensing device;
performing, using the designated driving electrodes without using other driving electrodes of the touch-sensing device, designated-area touch detection to detect touch input provided in the designated area;
responding to the touch input using at least one of the host device and the display device;
determining a previous-touch quantity, which is equal to a number of touches detected in a previous touch detection period;
comparing the required-touch quantity with the previous-touch quantity;
if the required-touch quantity is less than or equal to the previous-touch quantity, setting a previous-touch area as the designated area, wherein the previous-touch area corresponds to the touches detected in the previous touch detection period; and
if the required-touch quantity is greater than the previous-touch quantity, performing preliminary touch detection for determining the designated area.

4. The method of claim 3, wherein the preliminary touch detection is performed for a preliminary-detection time duration, wherein the designated-area touch detection is performed for a designated-area-detection time duration, and wherein the designated-area-detection time duration is longer than the preliminary-detection time duration.

5. The method of claim 3 comprising:
detecting one or more touches through the preliminary touch detection;
setting a touch-detected area based on information related to the one or more touches; and
setting a combination of the touch-detected area and the previous-touch area as the designated area.

6. The method of claim 3 comprising:
terminating the preliminary touch detection in response to a condition that a number of touches detected during the preliminary touch detection reaches the required-touch quantity.

7. The method of claim 3 comprising:
terminating the preliminary touch detection in response to a condition that a number of touches detected during the preliminary touch detection reaches a difference between the required-touch quantity and the previous-touch quantity.

8. The method of claim 3, wherein the preliminary touch detection uses more driving electrodes of the touch-sensing device than the designated driving electrodes.

9. The method of claim 3, wherein the preliminary touch detection comprises:
selecting a present driving electrode from the driving electrodes of the touch-sensing device;
detecting whether any touch is provided on the present driving electrode;
if at least one touch is detected on the present driving electrode, performing touch-sensing using an immediately neighboring driving electrode, and setting a first next present driving electrode, wherein no intervening driving electrode exists between the immediately neighboring driving electrode and the present driving electrode, and wherein at least two intervening driving electrodes exist between the first next present driving electrode and the present driving electrode; and
if no touch is detected on the present driving electrode, setting a second next present driving electrode, wherein at least one intervening driving electrode exists between the second next present driving electrode and the present driving electrode.

10. The method of claim 9, wherein no touch-sensing with the immediately neighboring driving electrode is performed between the detecting with the present driving electrode and the setting of the second next present driving electrode.

11. The method of claim 9 comprising:
determining whether the preliminary touch detection is terminated; and
if the preliminary touch detection is not terminated, selecting the first next present driving electrode or the second next present driving electrode as the present driving electrode.

12. A system for display an image comprising:
a host device configured to determine a required-touch quantity that is greater than or equal to two,
a touch-sensing device electrically connected to the host device, comprising driving electrodes, and comprising sensing electrodes intersecting the driving electrodes in a plan view of the touch-sensing device, wherein at least one of the host device and the touch-sensing device is configured to set a designated area based on the required-touch quantity greater than or equal to two, wherein the touch-sensing device is configured to perform designated-area touch detection using the designated driving electrodes without using other driving electrodes of the touch-sensing device to detect touch input provided in the designated area, wherein the designated area corresponds to a plurality of designated driving electrodes that is a subset of the driving electrodes of the touch-sensing device; and a display device electrically connected to the host device, wherein at least one of the display device and the host device is configured to respond to the touch input.

13. The system of claim 12, wherein the host device is configured to simultaneously run a plurality of application programs, to identifying among the application programs an application program that requires more touches as input than others of the application programs, and to set the required-touch quantity equal to a number of touches required by the application program.

14. The system of claim 12, wherein one or more of the host device and the touch-sensing device is configured to determine a previous-touch quantity, to compare the required-touch quantity with the previous-touch quantity, and to set a previous-touch area as the designated area if the required-touch quantity is less than or equal to the previous-touch quantity, wherein the previous-touch quantity is equal to a number of touches detected in a previous touch detection period, wherein the previous-touch area corresponds to the touches detected in the previous touch detection period, and wherein the touch-sensing device is configured to perform preliminary touch detection for determining the designated area if the required-touch quantity is greater than the previous-touch quantity.

15. The system of claim 14, wherein the touch-sensing device is configured to perform the preliminary touch detection for a preliminary-detection time duration, wherein the touch-sensing device is configured to perform the designated-area touch detection for a designated-area-detection time duration, and wherein the designated-area-detection time duration is longer than the preliminary-detection time duration.

16. The system of claim 14, wherein the touch-sensing device is configured to detect one or more touches through the preliminary touch detection and to set a touch-detected area based on information related to the one or more touches, and wherein the at least one of the host device and the touch-sensing device is configured to set a combination of the touch-detected area and the previous-touch area as the designated area.

17. The system of claim 14, wherein the touch-sensing device is configured to use more driving electrodes in performing the preliminary touch detection than in performing the designated-area touch detection.

18. The system of claim 14, wherein the touch-sensing device is configured to select a present driving electrode from the driving electrodes, to detect whether any touch is provided on the present driving electrode, to perform touch-sensing using an immediately neighboring driving electrode and set a first next present driving electrode if at least one touch is detected on the present driving electrode, and to set a second next present driving electrode if no touch is detected on the present driving electrode, wherein no intervening driving electrode exists between the immediately neighboring driving electrode and the present driving electrode, wherein at least two intervening driving electrodes exist between the first next present driving electrode and the present driving electrode, and wherein at least one intervening driving electrode exists between the second next present driving electrode and the present driving electrode.

19. The system of claim 12, wherein the touch-sensing device further comprises a channel selector and a driver, wherein the channel selector is configured to selectively electrically connect the designated driving electrodes to the driver while electrically disconnecting the other driving electrodes of the touch-sensing device from the driver.

* * * * *